United States Patent [19]

Miyake

[11] Patent Number: 5,522,667
[45] Date of Patent: Jun. 4, 1996

[54] BALL BEARING FOR TURBOCHARGER

[75] Inventor: Nobuhiko Miyake, Yokohama, Japan

[73] Assignee: NSK Ltd., Tokyo, Japan

[21] Appl. No.: 109,052

[22] Filed: Aug. 19, 1993

[30] Foreign Application Priority Data

Aug. 19, 1992 [JP] Japan .................. 4-063377 U
Nov. 26, 1992 [JP] Japan .................. 4-086817 U

[51] Int. Cl.$^6$ ............................................. F16C 33/44
[52] U.S. Cl. .................. 384/492; 384/523; 384/527; 384/513
[58] Field of Search .................... 384/492, 527, 384/516, 908, 909, 912, 523, 513

[56] References Cited

U.S. PATENT DOCUMENTS

| | | |
|---|---|---|
| 4,997,290 | 3/1991 | Aida . |
| 5,028,150 | 7/1991 | Kronenberger et al. . |
| 5,230,570 | 7/1993 | Bursey et al. .................. 384/908 |

FOREIGN PATENT DOCUMENTS

| | | |
|---|---|---|
| 3890466 | 5/1989 | Germany . |
| 3918323 | 1/1990 | Germany . |
| 60-208626 | 10/1985 | Japan . |
| 1-159419 | 6/1989 | Japan . |
| 1-220718 | 9/1989 | Japan . |
| 1-220719 | 9/1989 | Japan . |
| 1-299316 | 12/1989 | Japan . |
| 2-70923 | 3/1990 | Japan . |
| 2-54925 | 4/1990 | Japan . |
| 3-96716 | 4/1991 | Japan . |
| 3-117722 | 5/1991 | Japan . |
| 3-188127 | 8/1991 | Japan . |
| 3-88023 | 9/1991 | Japan . |
| 4-29617 | 1/1992 | Japan . |
| 4-95125 | 8/1992 | Japan . |
| 313564 | 5/1930 | United Kingdom . |
| 1243090 | 8/1971 | United Kingdom . |
| 2217395 | 10/1989 | United Kingdom . |

OTHER PUBLICATIONS

Japanese Technical Bulletin No. 92-1545, Feb. 1, 1992.
Derwent Abstract No. 92-017205/03 (Abstract of JP 3096716) (no date).

*Primary Examiner*—Lenard A. Footland
*Attorney, Agent, or Firm*—Evenson, McKeown, Edwards & Lenahan

[57] ABSTRACT

A ball bearing for use in a turbocharger comprising a housing and a rotating shaft for connecting an impeller to a turbine, the outer ring is supported by the housing therein, and the inner ring is fitted onto the rotating shaft in an axially mid portion thereof comprises an outer ring, an inner ring, a plurality of balls with a retainer between the outer ring and the inner ring, the retainer being made of a heat resistant synthetic resin, and guided by the outer ring, the bearing having a gap 14 for lubricant communication formed between the outer peripheral surface of the retainer 10 and the inner peripheral surface of the outer ring 6, and the gap 14 having a gap dimension t14 from 1.0% to 3.5% of the outer diametric dimension R of the retainer 10 at a room temperature.

8 Claims, 2 Drawing Sheets

BALL BEARING FOR TURBOCHARGER

FIELD OF THE INVENTION

The present invention is related to a ball bearing for turbocharger, specifically to a ball bearing which supports a rotating shaft connecting an impeller and turbine in a turbocharger used to improve output of an automotive engine, so that the rotating shaft is freely rotatable with respect to a housing.

BACKGROUND OF THE INVENTION

Turbochargers which compress intake air into the engine using the energy of the exhaust gas to increase engine output without altering the engine displacement are widely used. The exhaust energy is recovered by a turbine provided in an exhaust passage, and is transmitted by means of a rotating shaft fixed at one end of the turbine, to a compressor impeller provided in an intake passage so as to rotate the impeller. The impeller rotates at from several tens of thousand to several hundred thousand rpm depending on the engine operation, and compresses the air passing through the intake passage to the engine.

To improve the response of the above type of turbocharger, that is response in relation to accelerator operation, a recent widely accepted practice has been to support the rotating shaft by means of rolling bearings. FIG. 1 shows an example of a support construction for a rotating shaft of this type.

A pair of outer spacers 2 are loosely fitted inside a housing 1, and angular type ball bearings 4 are provided between the inner peripheral faces of the outer spacers 2 and an outer peripheral face of a rotating shaft 3, respectively. The ball bearings 4 each comprise an outer ring 6 having an outer raceway 5 on an inner peripheral face thereof, an inner ring 8 having an inner raceway 7 on an outer peripheral face thereof, a plurality of balls 9 provided so as to be freely rotatable between the outer raceway 5 and the inner raceway 7, and a retainer 10 for rotatably retaining the plurality of balls 9. The outer rings 6 of the respective ball bearings 4 are fixedly fitted inside the outer spacers 2, while the inner rings 8 are fixedly fitted around the rotating shaft 3, so that the rotating shaft 3 is supported so as to be freely rotatable inside the housing 1.

An inner spacer 11 is provided to keep the pair of inner rings 8 suitably spaced from each other, while a compression spring 12 is provided for applying a pre-load to the back-to-back pair of angular type ball bearings 4.

With the above type of construction, the ball bearings 4 for supporting the rotating shaft 3 require a high degree of heat resistance. In particular, the ball bearing 4 provided on the side of the turbine which absorbs the exhaust energy, comes under a strong influence from the heat of the high temperature exhaust gas (maximum temperature of approximately 950° C.), and thus requires a much higher degree of heat resistance. In view of this, heretofore U.S. Pat. No. 5,028,150, and Publication of Unexamined Japanese Patent Application KOKAI No. H2-70923 for example, disclose inventions related to turbocharger bearings wherein the inner ring which is exposed to a particularly high temperature is made from a heat resistant material such as M50, AISI 440C.

On the other hand, Publications of Japanese Unexamined Utility Model KOKAI Nos. H2-54925, H3-88023 and H4-95125 and Publications of Unexamined Japanese Patent Application KOKAI Nos. H3-96716, H3-117722, H3-188127, H4-29617, disclose inventions wherein the heat resistance of the retainer is improved through manufacture of the retainer using a heat resistant resin such as polyimide resin, Teflon, PTFE, etc. The retainer of H4-95125 is used in a turbocharger bearing for automobiles. Moreover, in the disclosure of Publication of Unexamined Japanese Patent Application KOKAI No. H1-159419, the balls 9 between the steel outer and inner rings of the ball bearing 4 are made from a ceramic. KOKAI No. H2-54925 above also has a ceramic rolling member. The ball bearings disclosed in the above publications which do not have retainers are so-called full compliment ball bearings.

With the turbo charger bearings heretofore known, only one part of the components of the ball bearing is improved, and there is no improvement in the interconnection of components. Consequently depending on operating conditions, there can be situations wherein heat resistance is inadequate, and sufficient endurance cannot be obtained, or turbo charger response cannot be improved.

Publications of Unexamined Japanese Patent Application KOKAI Nos. S60-208626, H1-220718 and H1-220719 disclose inventions related to rolling bearings comprising outer and inner rings having both heat resistance and corrosion resistance, and a rolling body made of ceramic. However, the object of these inventions is a rolling bearing for supporting a roller during hot dipping, and the bearings as disclosed, being without a retainer and the like, are not applicable for use as turbo charger ball bearings.

That is to say, in the case of rolling bearings such as the ball bearing disclosed in the beforementioned Publication of Unexamined Japanese patent Application KOKAI No. H1-159419 wherein a retainer for retaining the rolling body is not provided, the adjacent pairs of rolling bodies rub against each other with rotation of the shaft. Consequently undesirable resistance to rotation of the shaft is increased, and when used for supporting a rotating shaft of a turbo charger, response is undesirably impaired.

On the other hand, Publication of Unexamined Japanese Utility Model Application KOKAI No. H2-54925, and Technical Bulletin No. 92-1545 of Japan Institute of Invention and Innovation (Hatsumei Kyokai), disclose a construction wherein a retainer for a turbo charger ball bearing is made of a heat resistant synthetic resin and is guided by an outer ring. If the retainer is made from a synthetic resin having a low specific gravity, the response can be improved due to the reduction in inertial mass, while if the retainer is guided by the outer ring, oscillation of the retainer in a radial direction can be prevented and vibration during running can be minimized.

However, simply making the retainer from a synthetic resin and having the retainer guided by the outer ring does not result in a sufficiently satisfactory performance. That is to say, since the coefficient of linear expansion of synthetic resin greater than that of metals such as brass, steel and the like, then if the relationship between the outer diameter of the synthetic resin retainer and the diameter of the inner peripheral face of the outer ring acting as a guide for the synthetic resin retainer is not suitably determined, the resistance of the retainer to rotation becomes large or rattling of the retainer becomes excessive.

For example, if the outer peripheral dimension of the synthetic resin type retainer is close to the diameter of the inner peripheral surface of the outer ring, so that the gap between the outer peripheral face of the retainer and the inner peripheral face of the outer ring will be small, the outer peripheral face of the retainer and the inner peripheral face of the outer ring become very close together or in contact with each other with an increase in temperature during operation of the turbo charger.

if the outer peripheral face and inner peripheral face are very close together, it is difficult for the lubricating oil existing around the balls 9 to discharge to an outer portion; so that the amount of lubricating oil existing around the balls becomes more than required. As a result, the churning resistance of the lubricating oil due to the balls 9 is increased, the drive resistance of the ball bearings is increased, and the response of the turbo charger incorporating the ball bearings is impaired.

Moreover, with contact of the outer peripheral face of the retainer and the inner peripheral face of the outer ring, resistance to rotation of the retainer becomes extremely large, and not only is the response of the turbo charger severely impaired but also, depending on the situation, there is a possibility of seizure of the ball bearings.

On the other hand, by making the outer diametric dimension of the synthetic resin retainer smaller compared to the diameter of the inner peripheral face of the outer ring, then the clearance or gap between the outer peripheral face of the retainer and the inner peripheral face of the outer ring will be larger so that the retainer becomes susceptible to vibration during running. More specifically, it is difficult to make the mass of the synthetic resin retainer perfectly even around the circumferential direction and although the unevenness may be very slight, an unbalance in the mass around the peripheral direction cannot be avoided. As a result, if the clearance or gap large, then because of a free radial change in position of the retainer itself, the retainer vibrates when the retainer rotates at the high speed with running of the turbo charger.

Such unbalanced vibration of the synthetic resin retainer produces a harsh noise, and in extreme cases wear of the retainer and the possibility of failure.

The ball bearing for turbo charger of the present invention was conceived in view of the above situation.

SUMMARY OF THE INVENTION

A ball bearing of the present invention is used for a turbocharger and comprising a housing and a rotating shaft for connecting an impeller to a turbine and comprises an outer ring having an inner peripheral surface on which an outer raceway is formed, an inner ring made of a heat resisting metal and having an outer peripheral surface on which an inner raceway is formed, a plurality of balls rotatably provided between the outer raceway and the inner raceway, and a retainer made of heat resistant synthetic resin and having a plurality of pockets in which the balls is rotatably retained one by one.

DESCRIPTION OF PREFERRED EMBODIMENTS

Figure 1:
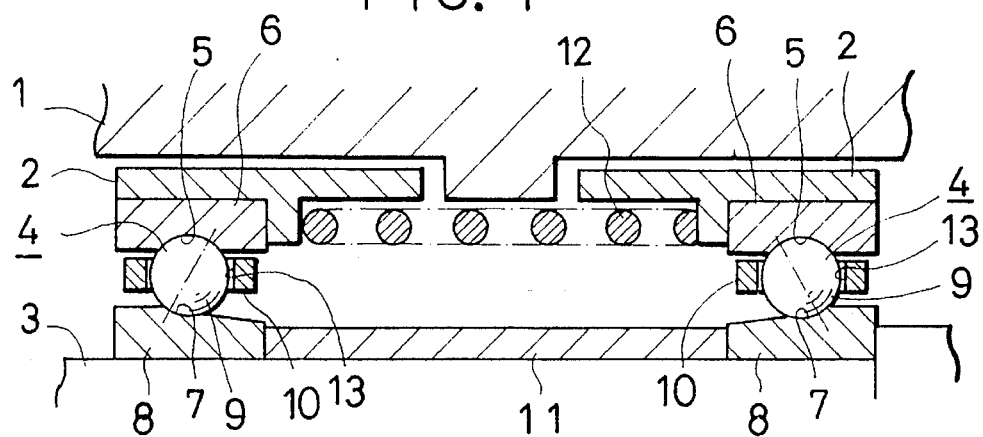
FIG. 1 is a partial cross-sectional view of a ball bearing for turbocharger in use as an example.

The turbo charger ball bearings of the present invention, as with the beforementioned conventional turbo charger ball bearings, are provided with an outer ring having an outer raceway on an inner peripheral face thereof and supported inside a housing, an inner ring having an inner raceway on an outer peripheral face thereof and fixedly fitted around an outer peripheral face on a central portion of a rotating shaft connecting an impeller and a turbine, a plurality of balls provided so as to be freely rotatable between the outer raceway and the inner raceway, and a retainer having the same number of pockets as the number of balls, for rotatably retaining each of the balls inside each of the respective pockets.

In particular, with the turbo charger ball bearings of the present invention in one feature, at least the inner ring of the inner and outer rings is made of a heat resistant metal, and the retainer is made of a heat resistant synthetic resin.

Moreover, with the turbo charger ball bearing disclosed in another feature, the retainer is made of a heat resistant synthetic resin, the outer peripheral face of the retainer is close to the inner peripheral face of the outer ring, the retainer is freely rotatably supported and guided by means of the outer ring, and the dimensions under normal conditions of the guide gap between the outer peripheral face of the retainer and the inner peripheral face of the outer ring is not less than 1% and not greater than 3.5% of the outer diametric dimension of the retainer.

With the turbo charger ball bearing according to the present invention constructed as above, since there is an additional improvement in the interconnection of components, sufficient endurance can be maintained and turbo charger response can be improved.

At first, in the case of the turbo charger ball bearing in the first feature, the inner ring is made of a heat resistant metal and the retainer is made of a heat resistant synthetic resin. Consequently, response is improved as a result of the reduction in inertial mass of the retainer, and response is also improved with a reduction in the viscosity of the lubricating oil. That is to say, by making the inner ring and the retainer of a heat resistant material, it is allowed to increase the temperature of the lubricating oil supplied to the ball bearing. If the temperature of the lubricating oil is increased, the viscosity of the lubricating oil is decreased proportionally so that the resistance of the balls and the retainer to rotation is reduced with a resultant improvement in response.

Furthermore, in the case of the turbo charger ball bearing in the second feature, since the retainer is made of a heat resistant synthetic resin, the above result can be obtained. Moreover, in this case, in addition to the above result, vibration of the retainer is suppressed, while the improvement in response and the endurance of the retainer is positively maintained, and seizure of the ball bearings is prevented.

That is to say, since the gap dimension of the guide gap between the outer peripheral face of the retainer and the inner peripheral face of the outer ring is made not less than 1% of the outer diametric dimension of the retainer, then even with an increase in temperature, a situation wherein the outer peripheral face and inner peripheral face become very close or in contact to each other is avoided. As a result, the problem with surplus lubricating oil remaining around the balls is avoided so that churning resistance of the balls is not increased. Furthermore, the increase in rotation resistance of the retainer is also avoided and turbo charger response is improved. In addition, since the gap dimension of the guide clearance or gap is kept up to 3.5% of the outer diametric dimension of the retainer, a large radial change in position of the retainer is avoided so that the retainer is less susceptible to unbalance vibration, Now preferred embodiments of the present invention is described referring to the attached drawings.

Figure 2A:
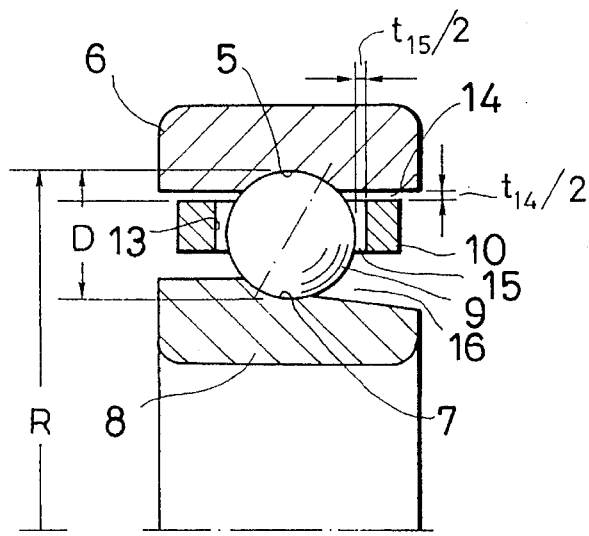
FIG. 2A is a partial cross-sectional view illustrating an embodiment in of the ball bearing for turbocharger according to the present invention.
Figure 2B:
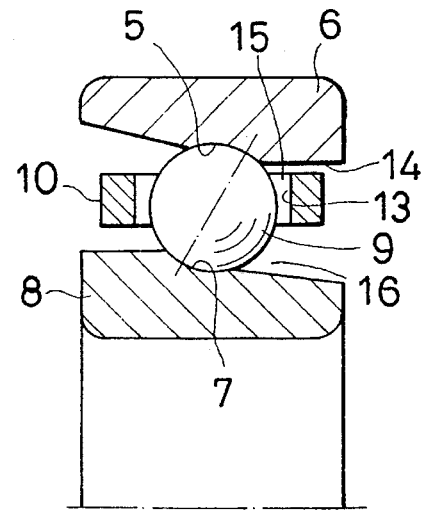
FIG 2B is a partial cross-sectional view illustrating an embodiment in of the ball bearing for turbocharger according to the present invention.
Figure 2C:
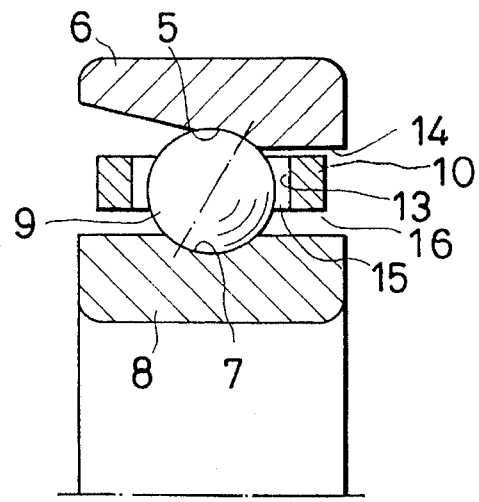
FIG. 2C is a partial cross-sectional view illustrating an embodiment in of the ball bearing for turbocharger according to the present invention.

FIGS. 2A–2C show three examples of turbo charger ball bearing configurations according to the present invention. In all cases, the bearings are provided with an outer ring 6 having an outer raceway 5 on an inner peripheral face thereof, an inner ring 8 having an inner raceway 7 on an outer peripheral face thereof, a plurality of balls 9 made of ceramic or bearing steel and provided so as to be freely rotatable between the outer raceway 5 and the inner raceway 7, and a retainer 10 having the same number of pockets 13 as the number of balls 90 for rotatably retaining each of the balls 9 inside each of the respective pockets 13.

The ball bearing shown in FIG. 2A has a deep groove type outer raceway 5 with the inner raceway 7 opened to one side only. The bearing shown in FIG. 2B has both the outer raceway 5 and the inner raceway 7 opened but to respective opposite sides, while the one of FIG. 2C has a deep groove type inner raceway 7 with the outer raceway 5 opened to one side only. However, all of the constructions are provided with the balls 9 contacting the outer raceway 5 and the inner raceway 7 at a contact angle and used in an angular type arrangement when assembled between the outer peripheral face of the turbocharger rotating shaft 3 (See FIG. 1) and the inner peripheral face of the outer spacer 2 supported in the turbocharger housing 1 (see FIG. 1).

At least the inner ring 8 of the outer ring 6 and inner ring 8, and preferably both the outer and inner rings 6 and 8 are made from a heat resistant metal such as heat resistant stainless steel, or molybdenum steel e.g. M50, SUS, 440C, SUS 420F etc. Moreover, the retainer 10 is made from a heat resistant synthetic resin having a maximum operating temperature above 150° C. such as polyimide resin, PPS resin, polyether sulfone (PES) resin, polyether imide (PEI) resin, polyamide imide (PAI) resin, polyether ketone (PEEK) resin.

With the turbocharger ball bearing according to the present invention constructed as above with at least the inner ring 8 made from a heat resistant metal and the retainer 10 made from a heat resistant synthetic resin, since the overall ball bearing has sufficient heat resistance, then even when exposed to high temperature exhaust gas during operation, sufficient durability can be realized. Consequently, even on the turbine side which is exposed to particularly high temperatures during use, stable bearing performance over a long period of time is possible.

With the ball bearings incorporated in a turbocharger, especially in the case of a sudden stop from a high speed engine run, the temperature of the ball bearing components rises rapidly. In particular the temperature of the inner ring 8 which is subjected to a considerable influence from the exhaust heat through the rotating shaft 3 rises very rapidly. In this situation, the life of the ball bearing is inclined to be decreased due to the reduction in hardness of the inner ring 8. However with the turbocharger ball bearings of the present invention, since at least the inner ring 8 is made from a heat resistant metal, it is less susceptible to this reduction in hardness so that stable performance over a long period of time is possible.

Automobiles having a turbocharger incorporated in it are sometimes provided with a so-called "after idling device" so that the engine does not stop immediately on switching off the ignition but continues idling for a certain period before being stopped automatically. In the case of the turbocharger ball bearings for automobiles having this "after idling device" incorporated, adequate endurance of both the outer ring 6 and the inner ring 8 can be ensured even when they are made from an ordinary bearing steel.

Since the retainer 10 also is made from a heat resistant resin, it does not deform, so that the impaired rotation of the balls 9 with deformation of the retainer 10 does not occur. Furthermore, since the retainer of synthetic resin type is light in weight compared to a retainer made from a metal, such as steel or gun metal, the torque required to rotate the retainer can be reduced. Consequently, the torque required for rotation of the rotating shaft 3 can be reduced with the ball bearing using a retainer of heat resistant synthetic resin, even when operating under the high temperature conditions of a turbocharger.

Moreover, by having the outer peripheral face of the retainer 10 and the inner peripheral face of the outer ring 6 in close proximity to each other, the retainer 10 rotates under guidance from the outer ring 6 so that the retainer 10 is supported by so-called "outer ring guidance". Furthermore, the surface roughness of the portion of the inner peripheral face of the outer ring 6 which is opposed to the outer peripheral face of the retainer 10 is preferably made no greater than 0.6 Ra, while the surface roughness of the outer peripheral face of the retainer 10 is made no greater than 1.0 Ra, and the surface roughness of the inner peripheral face of the retainer 10 is made no greater than 0.6 Ra. On the other hand, the roundness (which is also referred to as "out-of-roundness") of the inner peripheral face of the outer ring 6 is preferably made no greater than 0.04 and that of the outer peripheral face of the retainer 10 no greater than 0.04.

In addition, a gap or clearance 14 formed between the inner peripheral face of the outer ring 6 and the outer peripheral face of the retainer 10 for the passage of lubricating oil has a gap dimension of t14 {=(inner diametric dimension of outer ring 6—outer diametric dimension of retainer 10)}, which under normal or room temperature conditions is preferably set between 2% and 15% of the outer diameter D of the balls 9. A gap or clearance 15 formed between the inner peripheral face of the pocket 13 and the outer face of the respective balls 9 for the passage of lubricating oil has a gap dimension of t15 {=(inner diametric dimension of pocket 13—outer diameter D of ball 9)}, which under normal or room temperature conditions is preferably set between 2% and 15% of the outer diameter D.

As well as being determined by the relationship with the outer diameter D of the balls 9, the gap dimension t14 of the gap 14 is also determined by a relationship with an outer diametric dimension R of the retainer 10. That is to say, the gap dimension t14 is met between 1% and 3.5% of the outer diametric dimension R of the retainer 10 (0.01R<=t14<=0.035R).

The retainer 10 is thus guided by the outer ring, the surface roughness of the various portions controlled, and the gap dimension of the gaps 14 and 15 controlled, so that the torque necessary for rotation of the inner ring 8 can be minimized and the turbocharger response improved.

With lubrication of the ball bearings assembled in the turbocharger, the lubricating oil is directed (sprayed) onto the outer peripheral face of the inner ring 8. The oil which is attached to the outer peripheral face of the inner ring 8 is then separated from the outer peripheral face under centrifugal force to pass through the gap 15 formed between the inner peripheral faces of the pockets 13 and the outer faces of the respective balls 9, and out to the inner peripheral face of the outer ring 6. The lubricating oil which reaches the inner peripheral face of the outer ring 6 is then discharged through the gap 14 formed between the inner peripheral face of the outer ring 6 and the outer peripheral face of the retainer 10.

In order for the supply and discharge of lubricating oil to be carried out efficiently in this way, the cross sectional area must be sufficient large to ensure that the outer peripheral face of the inner ring 8 is exposed and that there is no significant resistance to the flow of lubricating oil through the respective gaps 15 and 14. Therefore, a relatively large space 16 is formed between the inner peripheral face of the retainer 10 and the outer peripheral face of the inner ring 8, with the retainer 10 guided by the outer ring and also with the gap dimensions of the gaps 15 and 14 controlled.

Furthermore, since the coefficient of linear expansion of the synthetic resin used in the retainer 10 is greater than that of the alloy steel used for the outer ring 6, the gap dimension t14 of the gap 14 is gradually reduced with rising temperature when the turbocharger is operated.

Figure 3:
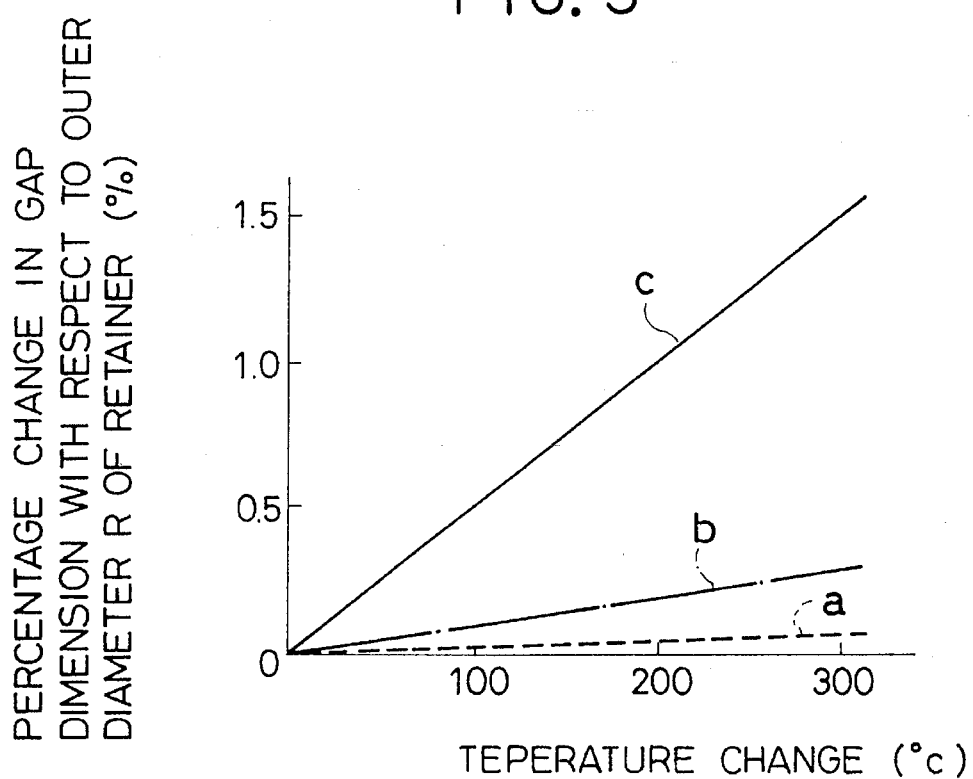
FIG. 3 is a graph showing a relationship between the temperature change and the width dimension of the gap between the outer peripheral face of the retainer and the inner peripheral face of the outer ring for three materials of the retainer.

According to experiments carried out by the present inventors, the gap dimension t14 changes with rise in temperature as shown by the dotted line "a" of FIG. 3 for the case where the retainer 10 is made from an alloy steel, and as shown by the chain line "b" for the case where the retainer 10 is made from a brass, while in comparison the gap dimension t14 changes with rise in temperature as shown by the solid line "c" in the same figure for the case where the retainer is made from a heat resistant synthetic resin. In FIG. 3, the horizontal axis or abscissa represents the amount of temperature change, while the vertical axis or ordinate represents the percentage change In the gap dimension t14 with respect to the outer diametric dimension R of the retainer 10.

The temperature of the turbocharger can be differentiated as much as 200° C. between the running and stationary states. Hence as shown in FIG. 3, in order to positively keep the gap 14 during use, the gap dimension t14 of the gap 14 should be no less than 1% of the outer diametric dimension R of the retainer 10.

Figure 4:
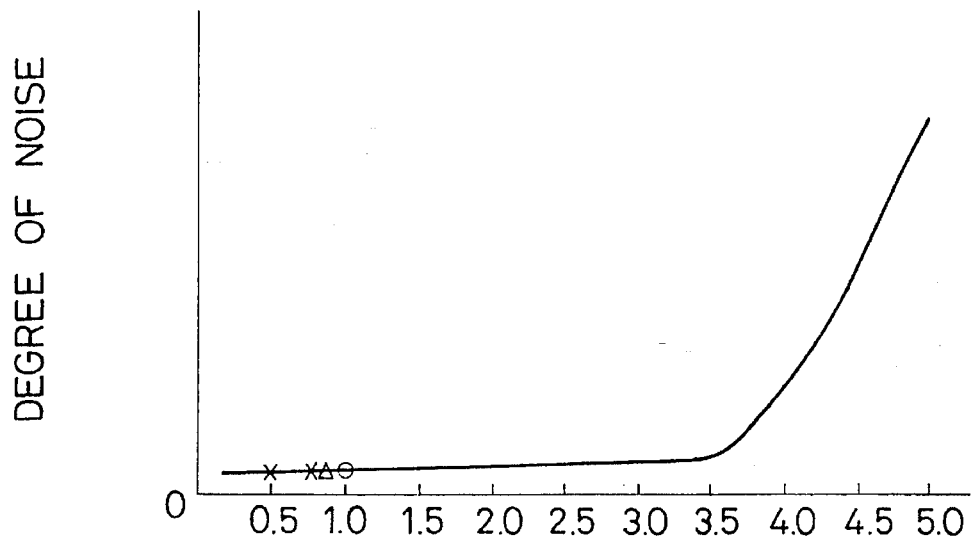
FIG. 4 is a graph showing a relationship between the width dimension of the gap mentioned above and the noise generated.

On the other hand, the maximum value of the gap dimension t14 is determined in relation to the fact that the unbalance vibration of the retainer 10 is suppressed during running of the turbocharger. In this respect, the present inventors carried out various experiments wherein the percentage of the gap dimension t14 of the gap 14 relative to the outer diametric dimension R of the retainer 10 was changed. As shown in FIG. 4, it was found that with an increase in the gap dimension t14 the operating noise generated by running the turbocharger gradually increased, and that when the percentage exceeded 3.5%, there was a marked increase in the operating noise.

Moreover, when the percentage indicated by "x" in the figure was approximately 0.5% to 0.75%, seizing occurred with operation of the turbocharger. Furthermore, when the percentage was approximately 0.8% as indicated by "Δ", an excessive amount of wear of the retainer 10 occurred. In addition, when the percentage was approximately 1.0% as indicated by "o", no particular problems were encountered.

As can be seen from FIGS. 3 and 4, if the gap dimension t14 is greater than 1% and less than 3.5% of the outer diametric dimension R of the retainer 10, the situation wherein the outer peripheral face of the retainer 10 and the inner peripheral face of the outer ring 6 become very close or in contact to each other does not occur even with the increase in temperature during running of the turbocharger. As a result, any excess lubricating oil around the balls 9, does not stay there, so that the churning resistance of the balls 9 does not increase. Furthermore, the increase in rotation resistance of the retainer 10 is also avoided, and turbocharger response is improved. At the same time, the large radial change in position of the retainer 10 is avoided so that the retainer 10 is less susceptible to unbalance vibration.

With respect of the fact that the flowability of the lubricating oil can be effectively improved by raising the temperature of the lubricating oil existing in the respective portions of the gaps or clearances 15 and 14, in the turbocharger ball bearing of the present invention wherein the retainer 10 is made from a heat resistant synthetic resin (and the outer ring 6, inner ring 8 and balls 9 are made of a ceramic material or a metal material having at least the heat resistance of a bearing steel so that a certain degree of heat resistance can be ensured), the amount of lubricating oil supplied to the bearing can be reduced, and the cooling due to the lubricating oil thus reduced, so that the temperature of the lubricating oil can be sufficiently raised to reduce its viscosity. Moreover, by keeping the amount of lubricating oil supplied to the ball bearing small in the above manner, the torque loss due to churning resistance of the lubricating oil can be reduced, so that the turbocharger can rotate with a lower torque and thus have a good response.

Furthermore, by controlling in surface roughness the inner peripheral face of the outer ring 6, the outer peripheral face of the retainer 10, and the inner peripheral face of the retainer 10 as mentioned before, the lubricating oil is able to flow more evenly so that impaired response due to an excessive amount of lubricating oil can be prevented. Moreover, by controlling the roundness or out-of-roundness in the inner peripheral face of the outer ring 6 and in the outer peripheral face of the retainer 10 as mentioned before, the resistance against the retainer 10 rotating inside the outer ring 6 can be reduced so that the retainer 10 rotates smoothly, and the torque required to rotate the inner ring 8 is reduced with an improvement in response.

With construction and operation of the turbocharger ball bearing according to the present invention as described above, sufficient durability is ensured and a stable performance can be maintained over a long period of time, with an improvement in turbocharger response.

What is claimed is:

1. A ball bearing for use in a turbocharger comprising a housing and a rotating shaft for connecting an impeller to a turbine, the ball bearing radially provided between the housing and the rotating shaft and axially between the impeller and the turbine, the ball bearing comprising an outer ring supported by the housing therein and having an inner peripheral surface on which an outer raceway is formed, an inner ring fitted onto the rotating shaft in an axially mid portion thereof and having an outer peripheral surface on which an inner raceway is formed, a plurality of balls rotatably provided between the outer raceway and the inner raceway, and a retainer having a plurality of pockets each having each of the balls rotatably retained therein, wherein the inner ring is made of a heat resisting metal, and the retainer is made of heat resistant synthetic resin able to resist an operating temperature above 150° C., and wherein the retainer has an outer peripheral surface and the outer ring has the inner peripheral surface spaced from the outer peripheral surface of the retainer a distance of from 1% to 3.5% of the outer diameter of the retainer, so that the retainer is rotatably supported between the outer ring and the inner ring and guided by the outer ring, the inner peripheral surface of the outer ring has a surface roughness up to 0.6 Ra at a portion opposed to the outer peripheral surface of the retainer, the outer peripheral surface of the retainer has a surface roughness up to 1.0 Ra, the inner peripheral surface of the retainer has a surface roughness up to 0.6 Ra, the inner peripheral surface of the outer ring has a roundness up to 0.04, the outer peripheral surface of the retainer has a roundness up to 0.04.

2. The ball bearing of claim 1, wherein a first clearance or gap for lubricant communication is formed between the inner peripheral surface of the outer ring and the outer peripheral surface of the retainer, and has a clearance or gap dimension from 2% to 15% of the outer diameter of the ball at a room temperature, and a second clearance or gap for lubricant communication is formed between the inner peripheral surface of the pocket and the outer peripheral surface of the ball and has a gap dimension from 2% to 15% of the outer diameter of the ball at a room temperature.

3. A bearing unit for a turbocharger comprising a rotating shaft (3), an outer bearing ring (6) having an outer bearing race (5) on its inner circumferential surface, an inner bearing ring (8) made of heat resistant metal and having an inner bearing race (7) on its outer circumferential surface, a retainer cage (10) rotatably arranged between the inner circumferential surface of the outer bearing ring (6) and the outer circumferential surface of the inner bearing ring (8), having on its circumference a plurality of pockets (13) in each of which a rolling body (a) is movably received, wherein said retainer cage (10) is made of heat resistant synthetic resin while a first annular clearance (14) for supplying lubricant is formed between the inner circumferential surface of the outer bearing ring (6) and the outer circumferential surface of the retainer cage (10) having a width (t14) at room temperature from 2% to 15% of the rolling diameter of the rolling body (9), and second clearances (15) for supplying lubricant are is formed between each inner circumferential surface of each pocket (13) and the outer circumferential surface of the corresponding rolling body (9), having a width (t15) at room temperature from 2% to 15% of the rolling diameter of the rolling body (9).

4. A bearing unit according to claim 3, wherein the outer bearing ring (6) is made of a heat resistant material.

5. A bearing unit according to claim 3, wherein said retainer cage (10) is rotatably arranged between the outer bearing ring (6) and the inner bearing ring (8) and guided by the outer bearing ring (6), while the inner circumferential surface of the outer bearing ring (6) has a surface roughness up to 0.6 Ra at a portion opposite the outer circumferential surface of the retainer cage (10), the outer circumferential surface of the retainer cage (1) has a surface roughness up to 1.0 Ra, and the inner circumferential surface of the retainer cage (10) has a surface roughness up to 0.6 Ra, and the inner circumferential surface of the outer bearing ring (6) and the outer circumferential surface of the retainer cage (10) have a roundness up to 0.04.

6. A bearing unit according to claim 3, wherein the rotating shaft (3) connects an impeller to a turbine while the bearing unit if formed as a radial bearing arranged between the casing (1) of the turbocharger and the rotating shaft (3) and axially between the impeller and turbine, and the outer bearing ring (6) is supported against the casing (1) and the inner bearing ring (8) is fitted onto the rotating shaft (3).

7. A bearing unit according to claim 3, wherein the rolling bodies are formed as balls (9).

8. A ball bearing for use in a turbocharger comprising a housing and a rotating shaft for connecting an impeller to a turbine, the ball bearing radially provided between the housing and the rotating shaft and axially between the impeller and the turbine, the ball bearing comprising an outer ring supported by the housing therein and having an inner peripheral surface on which an outer raceway is formed, an inner ring fitted onto the rotating shaft in an axially mid portion thereof and having an outer peripheral surface on which an inner raceway is formed, a plurality of balls rotatably provided between the outer raceway and the inner raceway, and a retainer having a plurality of pockets each having each of the balls rotatably retained therein, wherein the retainer has an outer peripheral surface and the outer ring has the inner peripheral surface provided close to the outer peripheral surface of the retainer, so that the retainer is rotatably supported between the outer ring and the inner ring and guided by the outer ring, wherein a guide gap is formed between the inner peripheral surface of the outer ring and the outer peripheral surface of the retainer, and has a gap dimension from 1% to 3.5% of the outer diametric dimension of the retainer at a room temperature.

* * * * *